Dec. 31, 1946. G. T. KEMMERLING 2,413,504
PISTON ROD PACKING RETAINER RING
Filed Oct. 20, 1943

G. T. Kemmerling
INVENTOR.

BY
Knowles
ATTORNEYS.

Patented Dec. 31, 1946

2,413,504

UNITED STATES PATENT OFFICE 2,413,504

PISTON ROD PACKING RETAINER RING

George T. Kemmerling, St. Paul, Minn.

Application October 20, 1943, Serial No. 507,041

3 Claims. (Cl. 286—20)

This invention relates to piston rod packing, the primary object of the invention being to provide a device of this character including a ring adapted to be fitted around a piston rod, the ring contacting with the packing, securely holding the packing in its proper position against displacement, under wear.

An important object of the invention is to provide a piston packing embodying separable sections adapted to be positioned around a piston rod, eliminating the necessity of removing the cross head to position the packing.

Another object of the invention is to provide a packing ring securing means, which will firmly secure the ring in position against the packing, making it impossible for the packing to open and leak steam.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
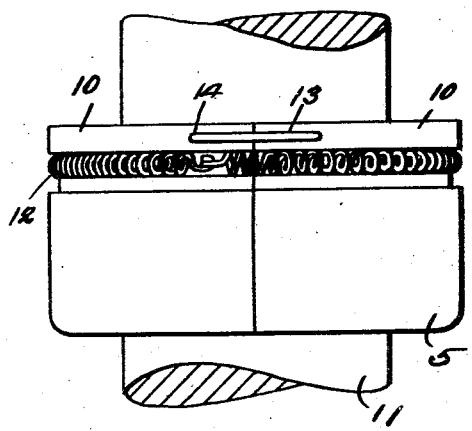
Figure 1 is an elevational view illustrating a piston rod packing, constructed in accordance with the invention.
Figure 2:
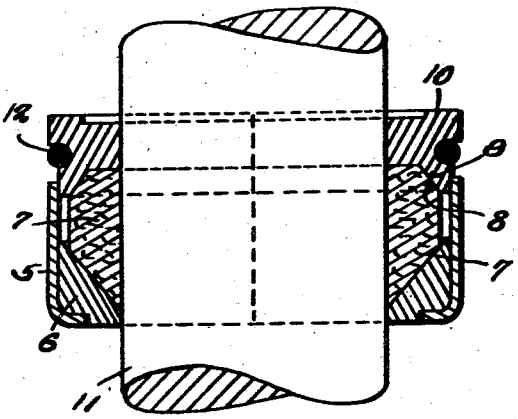
Figure 2 is a sectional view through the packing.
Figure 3:
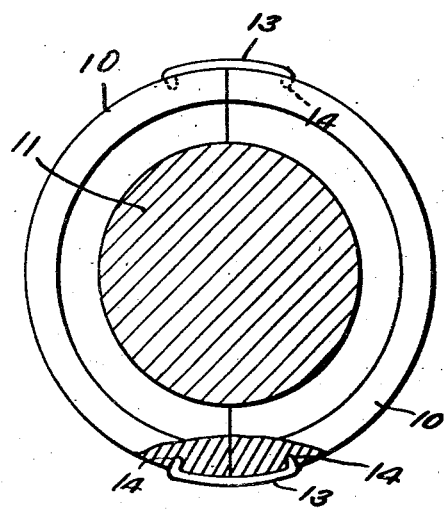
Figure 3 is a sectional view through the piston rod, showing the packing as positioned on the rod, a portion of the packing ring having been broken away to illustrate the mechanical securing means used in securing the sections of the packing together.

Referring to the drawing in detail, the reference character 5 designates the sectional body portion or shell of the packing. Held within the body portion 5, is a split ring member 6 which is formed with a beveled inner surface against which the packing member 7 engages, the packing member 7 also having a beveled surface, as shown by Figure 2 of the drawing.

The upper edge of the packing 7 is beveled as at 8, the beveled surface 8 contacting with the beveled inner surface 9 of the packing retainer ring 10.

This packing retaining ring 10 is also split, so that it may be readily positioned around the piston rod with which it is used, the piston slide in the present showing being indicated by the reference character 11.

Figure 4:
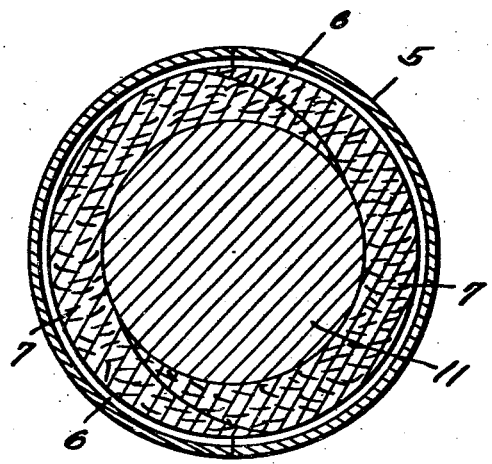
Figure 4 is a sectional view through the packing, taken at right angles to Figure 2.

The packing member 7 also embodies semicircular sections which have their ends beveled at approximately 45 degree angles, so that contacting ends of the sections will overlap, as clearly shown by Figure 4 of the drawing. Thus it will be seen that due to this construction, the ring member 10 acts to press the sections of the packing member together, holding them against movement, under wear.

The ring 10 is also formed with an angular groove, in which the coiled spring 12 is held, the ends of the coiled spring being secured together, so that the spring is normally placed under tension, to urge the sections of the packing retaining ring 10 into close engagement with the piston rod, with which the packing is used.

Adjacent to the ends of the sections of the packing retaining ring 10, are sockets, in which the ends 13 of the retaining members 14 are positioned, the retaining members overlying the contacting ends of the packing retaining ring 10, holding them together, against displacement.

What is claimed is:

1. A rod packing comprising a sectional body portion adapted to be fitted around a piston rod, a split ring member having a beveled surface, fitted within the body portion, a split packing member having beveled overlapping ends, fitted within the body portion and having a beveled surface cooperating with the beveled surface of the split ring member, a packing retaining ring embodying sections, fitted around the piston rod and engaging said packing member, yieldable means for urging the sections of the packing retaining ring toward the piston rod, and retaining members connecting the sections of the packing retaining ring, securing the sections of the packing retaining ring against displacement.

2. A rod packing comprising a body portion adapted to be fitted on a piston rod, a ring member within the body portion, said ring member having a beveled surface, a packing member fitted within the body portion and having a beveled surface cooperating with the beveled surface of the ring member, a packing retaining ring fitted against the packing member, said packing retaining ring and packing member having cooperating beveled surfaces, a yieldable member for gripping the packing retaining ring, said packing retaining ring embodying sections, said sections having sockets, retaining members having inturned ends fitted within the sockets, and said retaining members adapted to secure the sections of the packing retaining ring together, under abnormal pressure conditions.

3. A rod packing comprising a sectional hollow body portion, adapted to be fitted around a piston rod, a split ring member fitted within the hollow body portion, said split ring having a beveled inner surface, a split packing member having a beveled surface engaging the beveled inner surface of the split ring member, a split packing retaining ring positioned against the packing member, the inner end of the packing retaining ring being fitted within one end of the hollow body portion, a coiled spring positioned around the split packing retaining ring, and retaining members connected with the sections of the packing retaining ring at points adjacent to one end of the packing retaining ring, adapted to hold the sections of said ring together, under abnormal pressure conditions.

GEORGE T. KEMMERLING.